Nov. 19, 1957     LA VERNE R. PHILPOTT     2,814,036
RANDOM REPETITION RATE PULSE SIGNALLING SYSTEM
Filed Jan. 15, 1946     2 Sheets-Sheet 1

INVENTOR.
LA VERNE R. PHILPOTT
BY

ATTORNEY

INVENTOR.
LA VERNE R. PHILPOTT
BY
ATTORNEY

United States Patent Office 2,814,036
Patented Nov. 19, 1957

2,814,036
RANDOM REPETITION RATE PULSE SIGNALLING SYSTEM

La Verne R. Philpott, Washington, D. C.

Application January 15, 1946, Serial No. 641,366

6 Claims. (Cl. 343—13)

(Granted under Title 35, U. S. Code (1952), sec. 266)

This invention relates to pulse signalling systems and in particular to pulse echo ranging systems operable despite the presence of pulse type interference.

In pulse echo ranging systems as presently employed the usual operation is that of emitting bursts of energy, with a predetermined period of time separating each energy burst. In this time interval the emitting source is quiescent to permit the reception of echo energy reflected by objects in the path of the emitted energy. This periodic emission of energy is continued, usually at a substantially fixed rate as determined by some particular timing element associated with the source of emitted energy. With a system timed in this manner, a signal emitted by a second energy source with a fixed time relationship to the signal emitted by the echo ranging system may appear as a fictitious echo signal received from a distant reflecting object. Such a fictitious echo signal is generally objectionable because of the possibility that it may occur in time coincidence with an echo signal from a reflecting object and obscure weak echo signals. A typical situation in which this condition may be encountered is that wherein two pulse echo ranging systems are synchronized from a single sinusoidal signal source. In this situation a first one of the ranging systems may be repeatedly triggered before the second ranging system causing the appearance of false echo signals on one or both systems.

It is therefore an object of the present invention to provide a method of pulse signalling in which interference as a result of the presence of a second pulse signal source in the vicinity is reduced to a minimum.

Another object of the present invention is to provide a pulse signalling system providing continuity of satisfactory operation despite the emission of periodic pulse energy by a second signal source operating in the vicinity.

Another object of the present invention is to provide a signal generator for producing an aperiodic pulse signal.

Another object of the present invention is to provide a signal generator for producing an aperiodic pulse signal in which the minimum pulse spacing, the maximum pulse spacing, and the average pulse spacing are known and readily controllable.

A further object of the present invention is to render difficult the detection of the operation of a pulse signalling system by aural methods.

Other and further objects and features of the present invention will become apparent upon a careful consideration of the following detailed description when taken together with the accompanying drawings which illustrate a typical embodiment of the invention and the manner in which that embodiment may be considered to operate.

According to the general concept of the present invention, a pulse echo ranging system is provided which is subject to a minimum of interference as a result of the operation of other pulse signal sources in the vicinity. To achieve a high degree of freedom from pulse interference, the repetition period of the pulse echo ranging system is varied at random between certain fixed limits. The result of this operation is that pulse signals emitted at a substantially constant recurrence rate by an interfering signal source cannot occur in a constant time relationship to the pulse signal emitted by the pulse echo ranging system. Thus the interfering pulse energy is spread over a time range with respect to the pulses emitted by the pulse signalling system without any great concentration of pulses occurring at any fixed time relative to the recurrent signal emitted by the pulse echo ranging apparatus.

Random repetition rate triggering of the signal generator device in the pulse echo ranging system may be obtained by the operation of a gas tube noise generator in a state of continual conduction. Ionization effects within the gas tube produce random noise voltage which may be employed for keying purposes.

Figure 1:
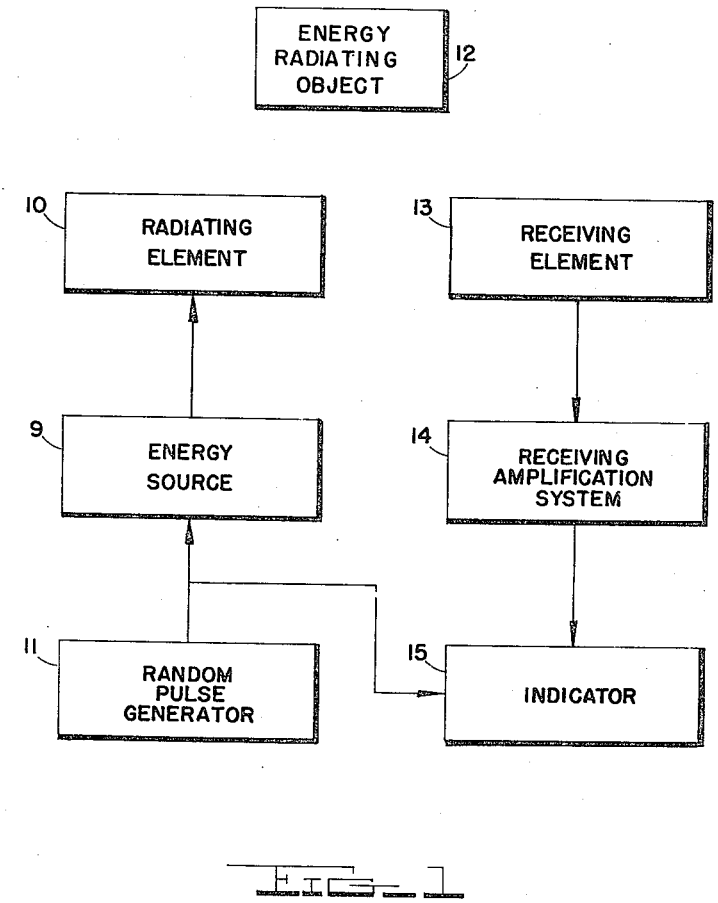
Fig. 1 is a block diagram of a pulse echo ranging system incorporating the features of the present invention.

With reference now to Fig. 1, a pulse echo ranging system constructed in accordance with the principles of the present invention is shown, including a source of high frequency energy 9, and a signal emitting device or radiating element 10 adapted to transfer energy from the source 9 to the transmission medium employed. The high frequency energy source 9 is preferably adapted to be keyed to produce short duration pulses of energy at a random repetition rate as established by the random pulse generator device 11. The pulses of high frequency energy emitted by the radiating element 10 travel outward in directions primarily determined by the directive characteristic of the element 10. If any energy radiating object such as a reflective object or surface 12, is located within the path of the emitted energy, some energy will be delivered to the receiving element 13 which may, if desired, be integral with the radiating element 10. The energy thus received is amplified in conventional manner by a system 14 and applied to an indicator 15 by means of which the time elapsing between the emission of a pulse of energy from the radiating element 10 and the reception of energy from a distant object may be measured. To obtain this indication, it is preferable that a cathode ray tube indicating device be employed with the sweep circuit thereof triggered by the keying pulses of generator 11.

It will thus be understood that the pulse signalling system of Fig. 1 may supply to the receiver indicator means a pair of signals, comprising an initial signal from the pulse generator 11 and a succedent signal from the space transmission path where successive initial signals are generated at random intervals.

Other circuit functions and the method of operation are substantially the same as those of periodically pulsing ranging systems; however, all filtering circuits, biasing circuits and other time constant associated circuits in the energy source 9, the receiving amplification system 14 and the indicator 15 must be adapted to random pulse rate operation.

Figure 2:
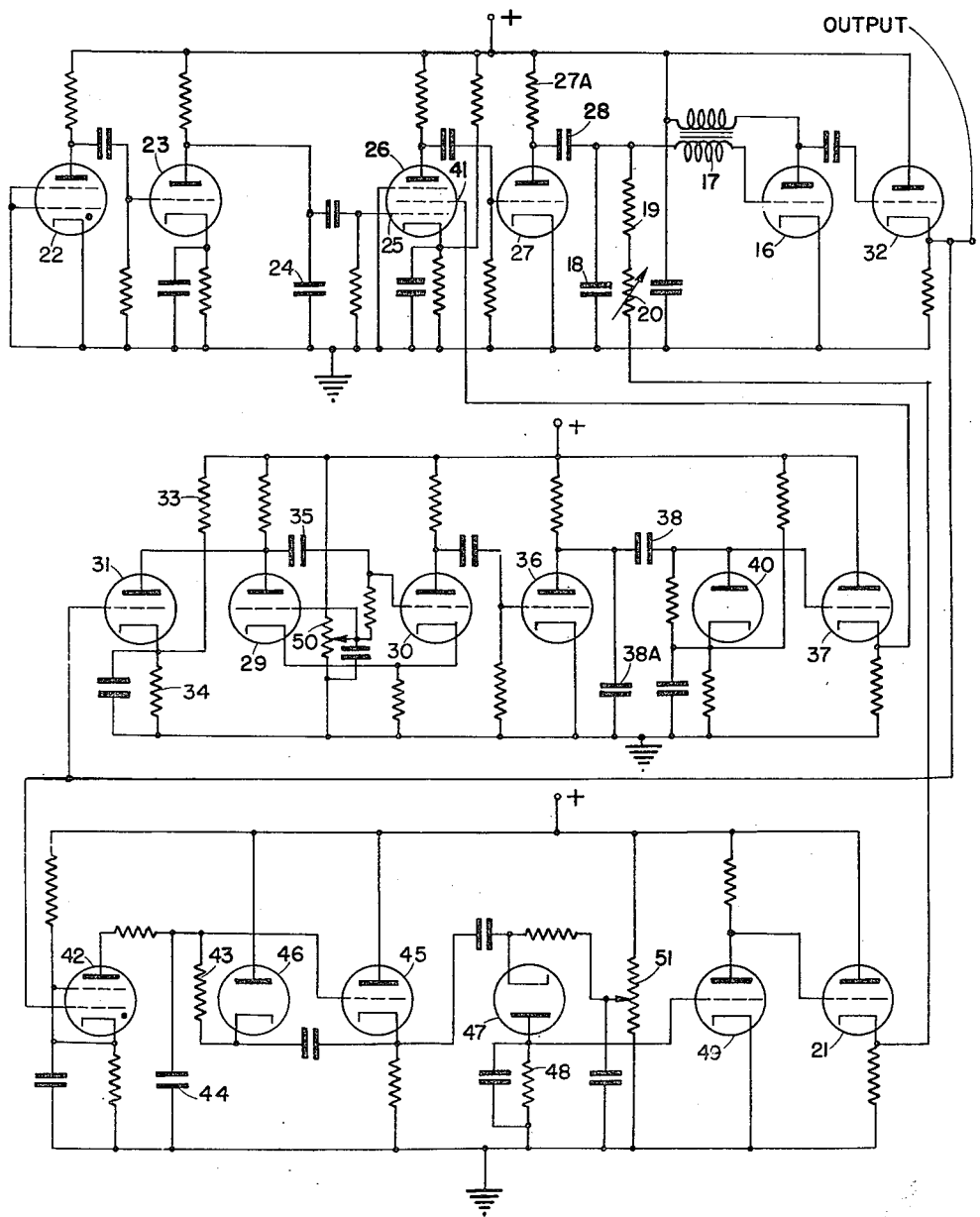
Fig. 2 shows in circuit diagram a typical random pulse generator keying device employed in the system of Fig. 1.

With reference now to Fig. 2, a preferred type of random repetition rate pulse generator is shown in detail. The circuit of this generator includes primarily a blocking oscillator type trigger circuit having an electron tube 16 and a coupling transformer 17 for producing sharply defined pulses of short duration. Biasing voltage for the blocking oscillator 16, 17 is developed across the capacitances 18 and 28 by the flow of grid current in tube 16 during the production of an output pulse thereby. At the conclusion of each output pulse capacitances 18 and 28 discharge exponentially through resistances 19, 20 and 27A and the low output impedance of a normally conductive cathode follower 21.

The biasing voltage developed by the flow of grid current in tube 16 is supplemented by changeable biasing voltages from two other sources. The first of these voltages is a variable D.-C. level and is supplied by the cathode follower 21. The second supplemental voltage is a random noise voltage produced preferably by a gas type electron tube 22. By means of these supplemental biasing voltages the normal free running period of the blocking oscillator 16, 17 is modified.

Noise voltages of random recurrence rates are generated by an electron tube 22 which is maintained in a state of continual conduction. Ionization effects in the tube itself produce varying voltages at the plate. The voltages thus generated are amplified in an electron tube 23. A filter capacitance 24 is placed between the plate of tube 23 and ground serving to remove the high frequency components of the generated noise voltage. To effect satisfactory removal of the high frequency components, it is desirable that the time constant circuit comprising capacitance 24 and the plate resistance of tube 23 be approximately equal to 1% of the average spacing between desired output pulses. The low frequency voltages produced across capacitance 24 are applied to a control element 25 of a gated amplifier 26. The output noise voltages from amplifier 26 are applied through a subsequent amplifier 27 and a coupling capacitor 28 to the blocking oscillator biasing capacitance 18.

An auxiliary time determining circuit is employed to control the operation of the gated amplifier 26 to establish the minimum time spacing between any two of the random output pulses. This minimum time spacing is of necessity greater than that required for the pulse energy to reach the vicinity of the energy radiating object. The minimum time determination is produced by a synchronized trigger circuit comprising the tubes 29 and 30 and a keying tube 31. The trigger circuit including tubes 29, 30 is preferably of the one-shot variety. In the quiescent state, tube 29 of the trigger circuit is not conductive, however; the production of a pulse signal by the blocking oscillator 16, 17 alters this condition. The positive excursion of the plate of tube 16 as that tube ceases conduction following its period of heavy conductivity causes heavy conduction by the cathode follower 32 resulting in a rise of the potential at its cathode. This rise in potential is applied to the grid of tube 31. Thus a condition of heavy bias upon tube 31, produced by the voltage divider 33, 34, is overcome and tube 31 becomes conductive. The resulting negative excursion of the plate of tube 31 is applied through capacitance 35 to the grid of tube 30 which is subsequently rendered nonconductive to initiate trigger action. The resulting positive voltage excursion of the plate of tube 30 brings tube 36 to heavy conduction producing a negative voltage excursion at the plate thereof. This voltage excursion is applied to the grid of a cathode follower 37 through a coupling circuit including capacitance 38 and the diode restorer 40. Thus the cathode of tube 37 is maintained at substantially zero potential for the duration of the nonconductive period of tube 30. When capacitance 35 discharges sufficiently to permit tube 30 to return to conduction, a high positive voltage is placed upon the cathode of tube 37 and then to the screen grid 41 of tube 26. Thus tube 26 which previously was unable to amplify signals applied to the control grid 25 because of low screen potential is placed in a condition capable of amplifying the noise signal produced by tube 22 and applying them to capacitance 18. Thereafter the first noise pulse produced by tube 22 is capable of causing triggering of the blocking oscillator 16, 17. To prevent triggering of the blocking oscillator 16, 17 when the screen grid 41 is raised to a high positive potential by cathode follower 37 it is desirable that an integrating circuit including capacitance 38A retard the rise in potential at the screen grid 41 of tube 26 so that capacitance 28 will charge through the plate resistance of tube 27 rather than apply a signal to capacitance 18.

A second supplemental source of biasing voltage for the blocking oscillator 16, 17 is the previously mentioned cathode follower 21 whose function is to maintain a constant average pulse repetition frequency. A preferable method by which this is accomplished is the following:

The voltage output of the cathode follower 32 is applied to a gas tube charging switch 42 which is a part of a linear sawtooth voltage generator. Also included in the sawtooth generator is a charging resistance 43, a charging capacitance 44, a cathode follower 45 and a charging diode 46. The linear sawtooth voltage produced at the cathode of tube 45 is applied to a diode rectifier 47. The negative voltage excursion produced at the cathode of tube 45 as tube 42 is brought to conduction by the pulse from the blocking oscillator 16, 17 causes conduction by the diode 47. Repetitive surges of current through the diode 47 are filtered by a long time constant circuit including resistance 48 connected between the plate of diode 47 and ground. The filtered negative potential produced at the plate of diode 47 is amplified by tube 49 and applied to the cathode follower 21. The output of cathode follower 21 is then applied through resistances 19, 20 to the grid of tube 16 to adjust the potential to which capacitance 18 attempts to charge after each output pulse and hence the average time interval between output pulses. Any deviation in the average pulse interval produces a compensating change in the potential at the cathode of tube 21 because of a change in average triggering rate of tube 42. It was found that the pulse generator just described produces the best random pulse spacing with a ratio of maximum time spacing between pulses to minimum time spacing between pulses equal to four. To this end the adjustment of controls 20, 50, 51 is made.

An adjustment of the maximum time spacing between pulses is possible by means of the variable resistance 20 which varies the time constant of the discharge path of the capacitances 18 and 28. The minimum time period between any two pulses is adjusted by means of the potentiometer 50 which selects the biasing potential applied to the trigger circuit 29, 30 and thereby controls the duration of the conductive period of tube 30. Selection of the average time spacing between output pulses is made by potentiometer 51 which controls a biasing voltage applied to the cathode of tube 47 and hence the magnitude of the rectified negative potential produced across resistance 48. The three pulse period controls are not without interaction hence any change in one of them will produce a change in the variable controlled by each of the other two.

From the foregoing discussion it is apparent that considerable modification of the features of this invention are possible, and while the device herein described and a form of apparatus for the operation thereof, constitutes a preferred embodiment of the invention it is to be understood that the invention is not limited to this precise device, and that changes may be made therein without departing from the scope of the invention which is defined in the appended claims.

The invention described herein may be manufactured and used by or for the government of the United States of America for governmental purposes without the payment of any royalties thereon or therefor.

What is claimed is:

1. A pulse echo ranging system operative to determine the position of a distant object despite the operation of a periodic pulse interfering signal source in the vicinity, comprising: a keyed signal generator for producing pulse energy, energy radiator means connected to the signal generator for emitting the energy thus produced, signal reception means receiving a part of emitted energy reflected from the distant object, received signal amplification means connected to the output of the signal reception means operative to amplify received signals, indicator means connected to said keyed signal generator and to the received signal amplification means for indicating elapsed time between the emission of a pulse of energy and the reception of a portion of that emitted energy reflected by the distant object to indicate thereby the position of the distant object, keying means including at least a vacuum type electron tube noise generating system connected to the keyed signal generator for producing random repetition rate keying of said keyed signal generator and means coupled to said keyed signal generator for maintaining a constant average pulse repetition rate.

2. A random repetition rate pulse generator, comprising: a free running pulse signal source having a natural operating period, a source of random noise voltage connected to the pulse signal source for altering at random the natural operating period of the signal source, first bias adjusting means for the free running signal source connected thereto for regulating the minimum time spacing of the random pulses, second bias adjusting means for the free running signal source connected thereto for regulating the maximum time spacing of the random pulses, and a third bias adjusting means connected to the pulse signal source responsive to changes in the average time spacing of the random pulses for holding the average time spacing of the random pulses substantially constant.

3. A pulse echo ranging system comprising, a transmitter for repetitively emitting short duration energy pulses, a receiver for receiving said pulses after reflection from remote objects, an indicator coupled to said receiver for indicating the range of the objects reflecting said energy pulses; and a transmitter pulsing circuit coupled to said transmitter operative to control the pulse period thereof comprising, a free running pulse signal source having a natural operating period, a source of random noise voltage coupled to said pulse signal source for altering at random the natural operating period of said pulse signal source, means decoupling said source of random noise voltage from said pulse signal source for a predetermined minimum time interval following a transmitter pulse, and means for maintaining a constant average pulse repetition rate.

4. A pulse echo ranging system comprising, a transmitter for repetitively emitting short duration energy pulses, a receiver for receiving said pulses after reflection from remote objects, an indicator coupled to said receiver for indicating the range of the objects reflecting said energy pulses; and a transmitter pulsing circuit coupled to said transmitter operative to control the pulse period thereof comprising, a free running pulse signal source having a natural operating period, a source of random noise voltage coupled to said pulse signal source for keying the same, and means decoupling said source of random noise voltage from said pulse signal source for a predetermined minimum time interval following a transmitter pulse to alter at random the natural operating period of said pulse signal source.

5. A random repetition rate pulse generator comprising, a free running pulse signal source having a natural operating period, a source of random noise voltage, a gating circuit means coupling said noise source to said pulse signal source for randomly keying said pulse signal source, and means responsive to an output from said pulse signal source for blocking said gating means for a predetermined minimum time interval following each output pulse from said pulse signal source.

6. A pulse echo ranging system comprising, a transmitter for repetitively emitting short duration energy pulses, a receiver for receiving said pulses after reflection from remote objects, an indicator coupled to said receiver for indicating the range of the objects reflecting said energy pulses; and a transmitter pulsing circuit coupled to said transmitter operative to control the pulse period thereof comprising, a free running pulse signal source having a natural operating period, a source of random noise voltage coupled to said pulse signal source for altering at random the natural operating period of said pulse signal source, means decoupling said source of random noise voltage from said pulse signal source for a predetermined minimum time interval following a transmitter pulse, and bias adjusting means coupled to said pulse signal source for regulating the maximum time spacing between successive random pulses.

References Cited in the file of this patent

UNITED STATES PATENTS

| | | |
|---|---|---|
| 2,075,285 | Hollingsworth | Mar. 30, 1937 |
| 2,143,035 | Smith | Jan. 10, 1939 |
| 2,181,568 | Kotowski | Nov. 28, 1939 |
| 2,333,688 | Shepard | Nov. 9, 1943 |
| 2,346,093 | Tolson | Apr. 4, 1944 |
| 2,407,199 | Wolff | Sept. 3, 1946 |
| 2,416,327 | Labin | Feb. 25, 1947 |
| 2,419,541 | De Rosa | Apr. 29, 1947 |
| 2,449,565 | Noble et al. | Sept. 21, 1948 |
| 2,671,896 | De Rosa | Mar. 9, 1954 |